(12) United States Patent
Peitz et al.

(10) Patent No.: US 11,307,281 B2
(45) Date of Patent: Apr. 19, 2022

(54) ACTIVATION OF A TRANSMITTING DEVICE OF A LIGHTING DEVICE

(71) Applicant: OSRAM GMBH, Munich (DE)

(72) Inventors: Christoph Peitz, Lippstadt (DE); Andrej Wallwitz, Munich (DE); Michel Stutz, Munich (DE); Karl-Heinz Wallwitz, Munich (DE)

(73) Assignee: OSRAM GmbH, Munich (DE)

( * ) Notice: Subject to any disclaimer, the term of this patent is extended or adjusted under 35 U.S.C. 154(b) by 277 days.

(21) Appl. No.: 16/348,039

(22) PCT Filed: Aug. 29, 2017

(86) PCT No.: PCT/EP2017/071634
§ 371 (c)(1),
(2) Date: May 7, 2019

(87) PCT Pub. No.: WO2018/086779
PCT Pub. Date: May 17, 2018

(65) Prior Publication Data
US 2019/0271755 A1    Sep. 5, 2019

(30) Foreign Application Priority Data
Nov. 11, 2016 (DE) .......................... 102016121663.1

(51) Int. Cl.
*G01S 1/00* (2006.01)
*G01S 1/02* (2010.01)
(Continued)

(52) U.S. Cl.
CPC ................ *G01S 1/024* (2013.01); *G01S 5/02* (2013.01); *H05B 47/19* (2020.01)

(58) Field of Classification Search
CPC .. G01S 1/024; G01S 5/00; G01S 5/02; H04W 4/00; H05B 39/00
(Continued)

(56) References Cited

U.S. PATENT DOCUMENTS 6,529,164 B1* 3/2003 Carter ................... G01S 5/0036
342/385
7,812,543 B2* 10/2010 Budike, Jr. ............ H05B 47/19
315/157
(Continued)

FOREIGN PATENT DOCUMENTS

| DE | 19639188 A1 | 4/1998 |
|---|---|---|
| EP | 0174913 A2 | 3/1986 |

OTHER PUBLICATIONS

Sommer Jürgen, et al.; "System-Level Power Accuracy Trade-Off in Bluetooth Low Energy Networks"; published Sep. 2, 2011; Network and Parallel computing; pp. 379-392; ISBN: 978-3-642-24784-2.
(Continued)

*Primary Examiner* — Chuong P Nguyen
(74) *Attorney, Agent, or Firm* — Viering, Jentschura & Partner MBB

(57) ABSTRACT

Lighting devices with lighting means, transmitting device for transmitting an electromagnetic data signal and energy buffer for current supply of the transmitting device are to be protected from exhaustive discharge. Thereto, an activation device is provided, by which the transmitting device can be activated from an energy-saving mode, in which the transmitting device is switched off, into an operating mode, in which the transmitting device is switched on for operationally transmitting the electromagnetic data signal.

18 Claims, 4 Drawing Sheets

(51) Int. Cl.
    *G01S 5/02*    (2010.01)
    *H05B 47/19*   (2020.01)
(58) Field of Classification Search
    USPC ........................................................ 342/385
    See application file for complete search history.

(56)                References Cited

U.S. PATENT DOCUMENTS

| | | | |
|---|---|---|---|
| 9,345,115 B2* | 5/2016 | Mohan | H05B 47/19 |
| 9,585,228 B2* | 2/2017 | Patel | G01S 5/16 |
| 9,746,542 B2* | 8/2017 | Ikehara | G01S 1/042 |
| 10,076,015 B2* | 9/2018 | Bernsen | H05B 47/19 |
| 10,390,183 B2* | 8/2019 | Taylor | G01S 5/0205 |
| 10,725,140 B2* | 7/2020 | Feil | G01S 1/68 |
| 10,849,205 B2* | 11/2020 | Batai | G01S 1/0428 |
| 10,880,976 B2* | 12/2020 | Stutz | H05B 47/19 |
| 10,973,109 B2* | 4/2021 | Feil | H05B 47/155 |
| 10,976,400 B2* | 4/2021 | Peitz | G01S 5/14 |
| 2014/0252958 A1* | 9/2014 | Subotnick | F21K 9/232 |
| | | | 315/149 |
| 2015/0076993 A1* | 3/2015 | Mohan | H05B 47/11 |
| | | | 315/153 |
| 2015/0237706 A1 | 8/2015 | Ben-Moshe et al. | |
| 2016/0073479 A1 | 3/2016 | Erchak et al. | |
| 2016/0127875 A1 | 5/2016 | Zampini, II | |
| 2016/0242264 A1* | 8/2016 | Pakkala | H05B 47/19 |

OTHER PUBLICATIONS

PCT; App No. PCT/EP2017/071634; International Search Report and Written Opinion dated Nov. 16, 2017.

\* cited by examiner

ACTIVATION OF A TRANSMITTING DEVICE OF A LIGHTING DEVICE

CROSS-REFERENCE TO RELATED APPLICATIONS

This application is a U.S. national phase application filed under 35 U.S.C. § 371 of International Application Number PCT/EP2017/071634, filed Aug. 29, 2017, designating the United States, which claims priority to German Patent Application No. 10 2016 121 663.1, filed on Nov. 11, 2016.

FIELD

The present invention relates to a lighting device with an illuminant, a transmitting device for transmitting an electromagnetic data signal and an energy buffer for current supply of the transmitting device. Moreover, the present invention relates to a corresponding method for operating such a lighting device.

BACKGROUND

So-called "beacons" can be combined with lamps to provide lamp-specific or other information. The beacon technology is based on a transmitter or transceiver system. A beacon (in German: Leuchtfeuer or also Bake or Peilsender) is a small, mostly battery-operated transmitter, which emits a signal in (definable) time intervals typically on the Bluetooth Low Energy (BLE) standard. The radio signal of each beacon is characterized by a unique identification number (so-called UUID). Beacons can be used to allocate a digital identification to objects and locations. Objects (at which the beacon is installed) and locations (at which a beacon is installed e.g. on a wall) can be identified by terminals (e.g. smart devices) in the signal field of the beacon in this manner.

With the aid of a beacon, a location can for example be identified and localization can be performed, respectively. By placing one or more beacons in a building area, a type of radio-based raster arises, in which a smart device can localize itself via the BLE interface as well as corresponding algorithms. Therein, the individual identification numbers of the installed beacons give an identifier to a location, based on which a smart device can approximately determine the position (a basic transmission area of the beacon can be determined). Algorithms on the smart device can improve the position accuracy e.g. via signal strengths. Therein, it is required that the smart device can access to information in a data storage (e.g. on a cloud server) (e.g. identification number and a mapping). If a terminal, for example a smart device, comes into the range of a transmitter, it can detect the identification number and determine the site for example via a server query. Therein, the localizing algorithms access the received signal strength of the beacons in the vicinity among other things, in particular as an indicator for the distance to the respective beacon.

As was mentioned, beacons can basically be installed in the lighting technology and illumination technology, respectively. Therein, in particular the advantage is utilized that a light installation offers a permanent energy access to supply the beacon with energy. The advantage in turn results from it that the battery of the beacon does not have to be exchanged and thus corresponding life cycle cost and processes, respectively, can be saved. Moreover, parameterizations of the beacon with hither energy consumption can also be adjusted without the lifetime of the beacon being reduced. Installation processes of beacon and light technology can additionally be unified. A further advantage is a defined locking position of a beacon transmitter, which is well protected from manipulation. Thus, a clear and secure identifier can be allocated to a location.

An overview over benefit potentials of the integration of a beacon in a light installation can be taken from the following enumeration:

The energy supply of the light installation can be used instead of a battery to reduce the lifecycle cost of the beacon.

The energy supply of the light installation can be used to adapt the transmission parameters to the service and not to the available residual energy or the parameters of the battery (frequent transmission cycles for example generate a high accuracy of the services, but also higher energy consumption).

The exchange of the battery of conventional beacons bears risks, namely for example with regard to errors in the handling.

The non-availability of the services can be avoided by an uninterrupted energy supply of the beacon.

An installation location below the ceiling is ideal for the signal propagation of the beacon.

An installation location below the ceiling makes the overall system more robust against disturbances/shadings by objects at the level of the floor level in contrast to an installation of the beacon itself at the level of the floor level.

A beacon can be protected from manipulations/unauthorized accesses (unintentional, intentional).

Lighting and services (e.g. localization services) can be offered as an overall system "from a single source".

There is the possibility of using the safe communication network of the light installation to for example configure the beacon or to link the beacons with each other.

A unification of the installation processes of beacon and light installation is possible.

Furthermore, there is the possibility of coupling to further system elements of the peripheral building infrastructure via the communication network of the light installation, e.g. to elements of the safety technology.

An optically attractive system can be provided since the beacon can be non-visibly accommodated in the light installation.

FIG. 1 shows a schematic representation of the integration of a beacon in a light installation. A central beacon B1 is arranged on an electrical lighting means BE, which the physical connection PV1 indicates. Optionally, a module M with data processing unit DV and data interface DS is associated with the beacon B1. The beacon B1 is in communication with a terminal E via a wireless communication link KV1. Multiple terminals can also be available for the communication with the beacon B1. The beacon B1 together with the terminal or terminals E constitutes a data transfer system DT.

The beacon B1 can be in communication link KV2 with one or more further beacons B2. Further, a communication link KV3 to an infrastructure device IE, e.g. Internet or central service server, can be present. The infrastructure device can serve for controlling and/or communicating information.

The local beacon B1 of the electrical lighting means BE can serve as a pure transmitting device or else as a combined transmitting-receiving device.

In an example of employment, human beings and apparatuses optionally have the challenge to orient themselves within an area, to navigate or to locate and use, respectively, other local digital services (e.g. apps or app functions, Google Maps, Lightyfy light control etc.). The light installation with integrated beacon in an area becomes a localization and orientation system, respectively, for these benefit potentials. With the self-localization of the terminal realizable thereby, services can now be provided such as for instance navigation or the provision of location-specific information.

An aspect of the beacon technology is the possibility of configuration of typical parameters such as for example signal strength and transmission interval of the beacon. With different configurations, different scenarios of application can be individually supported. If a high service quality (accurate localization in short intervals) is requested (such as e.g. in indoor navigation), e.g. very short transmission intervals are to be configured.

At present, batteries are employed for the energy supply of the beacons. By the requirement of changing these batteries in periodic cycles, high effort as well as correspondingly high lifecycle cost for the beacon arise.

A high service quality—for example high localization accuracy, high range, short transmission interval—requires comparatively much energy in the transmitter module such that the battery of a battery-operated beacon has to be exchanged after short time (e.g. after one month). Each exchange of a battery additionally bears the risk that the functionality of the localization system is adversely affected by a small positional change or false handling of the beacon.

Optionally, there is the risk that the operator (e.g. owner of a supermarket) is not aware of the energy deficiency of the beacon and does not find again the beacon, respectively, if sufficient residual energy is not present anymore. However, the services of the beacon (e.g. navigation) should be permanently available to the user. This requires an uninterrupted energy supply.

The attachment or installation of the beacons on/in or as a part of the light installation or an illuminant would allow using the energy supply of the light installation (e.g. ballast of the lamp or the illuminant) for the energy supply of the beacons and thus substituting the battery of the beacon and counteracting the problems associated therewith (compare above) with respect to a battery-operated beacon.

Accordingly, transmitting-receiving devices or transmitting devices (e.g. beacons) in/on or as a part of a light installation/lamp or an illuminant (below briefly termed lighting means) are here considered, wherein the device is supplied with energy via the lighting means. At the same time, at least one energy buffer (e.g. accumulator, capacitor) is part of the overall system. It provides the required energy to the transmitting-receiving device, for example the beacon, in the operation if the energy supply by the lighting means is interrupted (e.g. in the event that the lamp is switched off and does not emit light).

In the production, a pre-charged energy buffer (e.g. accumulator) is for example mounted in the overall system or installed within the scope of the mounting process. However, the transmitting-receiving device is in a state, in which current is constantly consumed such that exhaustive discharge of the energy buffer can occur in the course of the subsequent logistic processes up to the installation or startup of the overall system in the service area.

The object of the present invention is in avoiding an exhaustive discharge of an energy buffer before startup of a lighting device comprising a transmitting device and the energy buffer.

SUMMARY

According to the invention, this object is solved by a lighting device according to claim 1 as well as a method according to claim 20. Advantageous developments of the invention are apparent from the dependent claims.

Accordingly, a lighting device with a lighting means, a transmitting device for transmitting an electromagnetic data signal and an energy buffer for current supply of the transmitting device is provided according to the invention. The lighting means can be any device, by which rooms and areas, respectively, can be lighted. The transmitting device can emit an electromagnetic data signal, which is usually not visible. For example, the transmission is effected according to the BLE (Bluetooth Low Energy) standard. However, the transmission can also be effected by another technology. In particular, so-called beacons can be used as the transmitting devices. In order that an uninterrupted current supply of the transmitting device is ensured, the lighting device is equipped with an energy buffer for current supply of the transmitting device. Thus, the energy supply of the transmitting device can for example be effected via the lighting means, i.e. the illuminant or the lamp/light installation, in the normal operation of the lighting device, and the energy supply of the transmitting device is effected via the energy buffer with the lighting means switched off.

Furthermore, the lighting device is equipped with an activation device, by which the transmitting device can be activated from an energy-saving mode, in which the transmitting device is switched off, into an operating mode, in which the transmitting device is switched on for operationally transmitting the electromagnetic data signal. This means that a special activation device is provided to activate the transmitting device. Only in this activated mode, i.e. the operating mode, the transmitting device consumes the operating power usual for transmitting. In the energy-saving mode before the activation, the transmitting device only consumes a fraction of this operating power, which is in particular at least one order of magnitude below. In this manner, it is possible that the transmitting device only consumes considerable energy if it was deliberately activated. This is usually effected only if the lighting device is in service.

Preferably, the lighting device comprises a mains supply terminal, via which both the lighting means and the transmitting device and/or the energy buffer can be supplied with energy. Thereby, there is the great advantage that both the transmitting device and the lighting means can be supplied with energy via a common terminal. Thereby, a separate energy supply of the transmitting device is not required.

In a particular configuration, the lighting means, the transmitting device, the energy buffer and the activation device are accommodated in a common housing. This means that the lighting device is a module or a compact device, which can be simply installed.

According to a development, the transmitting device is switchable to a transmitting-receiving operation and/or a configuration operation by the activation device in the operating mode. This means that there is not only the possibility of switching from the energy-saving mode into the operating mode, but also to change between a transmitting-receiving operation and a configuration operation within the operating mode by the activating device. Thereby, there is high flexibility in particular in the installation.

Furthermore, the activation device can comprise a photo detector, by which a light pulse for activating the transmitting device or for switching the transmitting device is detectable. In advantageous manner, the activation device can thereby be controlled via light pulses or flashes. Hereto, the flash light of a smartphone can for example be used. The photo detector does not have to be restricted to detect visible light, but it can for example also detect infrared light.

In a special variant, it can be provided that the transmitting device can be cyclically activated by the activation device. This means that the transmitting device is automatically activated in predetermined time intervals (e.g. one minute). For example, if a connection request is then not present, thus, deactivation can again be automatically effected. Otherwise, the transmitting device can remain activated.

Further, the transmitting device can be formed such that it transmits a signal and examines if a connection request is present after each activation. This means that the transmitting device examines if an activation from the outside is actually desired. Only in this manner, it can be prevented that the transmitting device remains in operation for an excessively long time after automatic activation.

Moreover, the activation device can be formed such that the transmitting device is automatically activated as soon as the lighting device is supplied with energy by an external energy supply device. Thus, the transmitting device can for example be automatically activated in that it is connected to an energy supply network. The examination is for example effected based on a measurement of a voltage level. In this manner, it can be ensured that the transmitting device substantially only consumes energy if it is connected to an energy supply network.

Optionally, an input voltage of the lighting device can be acquired by a digital-analog converter and a corresponding value can be digitally transferred to the activation device or can be communicated from the energy supply device to the activation device via a communication interface of the lighting device. The analog-digital converter is preferably arranged between a battery and a computing unit of the activation device. Alternatively, a control unit of the energy supply device can communicate the voltage value via the communication interface.

The activation device can comprise a computing unit, by which the type of the energy supply of the transmitting device or a state of charge of the energy buffer is recognizable. This recognition can for example be effected based on the level of a voltage value or other characteristics.

Further, the activation device can be formed to decide that the transmitting device is allowed to be activated despite of an activated exhaustive discharge protection in case of an external current supply. Thus, if mains supply is present, the activation has higher priority than a possibly set exhaustive discharge protection.

Similarly, the activation device can be formed to decide that the transmitting device is activated or is allowed to be activated despite of an activated exhaustive discharge protection in case of internal current supply. Therein, the activation device can in particular be formed to recognize periodic switching cycles of the transmitting device. Thus, the system recognizes or approximates that it is installed in a light installation and therefore will again be supplied with current for charging the accumulator any time soon.

Additionally, the lighting device can be formed such that the transmitting device does not change to the energy-saving mode after an external current supply has been effected for a preset period of time. For example, the system is preconfigured such that it is no longer allowed to change to an exhaustive discharge protection or that it is no longer allowed to change to a mode, in which the transmitting device is readily deactivated, at a certain current supply time (e.g. longer than two hours). Thus, it is also possible that the system autonomously changes to a mode, in which it activates the transmitting device without autonomously deactivating it again with first-time external current supply.

According to a further embodiment, a functionality of the lighting device and in particular of the transmitting device is automatically restricted if the state of charge of the energy buffer falls below a preset limit value. Thus, from a certain accumulator state of charge, which can also be read out, the functionality of the system or the transmitting device is for example severely restricted to additionally minimize the current consumption (e.g. no examination of the battery, no transmission anymore etc.). Optionally, only examination in terms of circuit for external current supply is effected.

In addition, the activation device can be formed to examine a current supply of the lighting device in preset intervals and to correspondingly control the transmitting device. Thus, the computing unit of the activation device for example controls the transmitting device as well as the above mentioned examination intervals and queries of the current supply, respectively.

In a further configuration, the activation device is formed such that the transmitting device is activated as soon as a preset activation pattern is transferred to the lighting device via an external energy supply device. Thus, the connection of the lighting device to an energy supply device alone is not sufficient, but it has to transfer a signal with a preset activation pattern to the lighting device for activation. Thereby, the transmitting device of a lighting device can for example be activated with the aid of a light switch, by which the activation pattern is generated.

In addition, the lighting device can additionally comprise a battery for supply of the transmitting device besides the energy buffer, wherein the battery can be automatically electrically disconnected from the transmitting device if the lighting device obtains energy from an external energy supply device. Thus, the energy of the battery is only consumed until the lighting device is connected to an external energy supply. Thereby, the battery can for example supply the transmitting device with energy before the installation.

According to a development, the activation device contains an insulating element, by the removal of which the transmitting device is switched from the energy-saving mode into the operating mode. Thus, a galvanic separation of the electric circuit of the transmitting device from the energy buffer can for example be effected as long as the services of the transmitting device are not required.

According to the invention, the above mentioned object is also solved by a method for operating a lighting device with a lighting means, a transmitting device for transmitting an electromagnetic data signal and an energy buffer for current supply of the transmitting device by activating the transmitting device by means of an activation device of the lighting device from an energy-saving mode, in which the transmitting device is switched off, into an operating mode, in which the transmitting device is switched on for operationally transmitting the electromagnetic data signal.

The advantages and developments described above in context of the lighting device according to the invention are analogously also applicable to the method according to the invention. Herein, the corresponding functional features of the means of the lighting device are considered as method features of the method.

BRIEF DESCRIPTION OF THE DRAWINGS

Now, the present invention is explained in more detail based on the attached drawings, in which there show.

DESCRIPTION OF THE PREFERRED EMBODIMENTS

Figure 1:
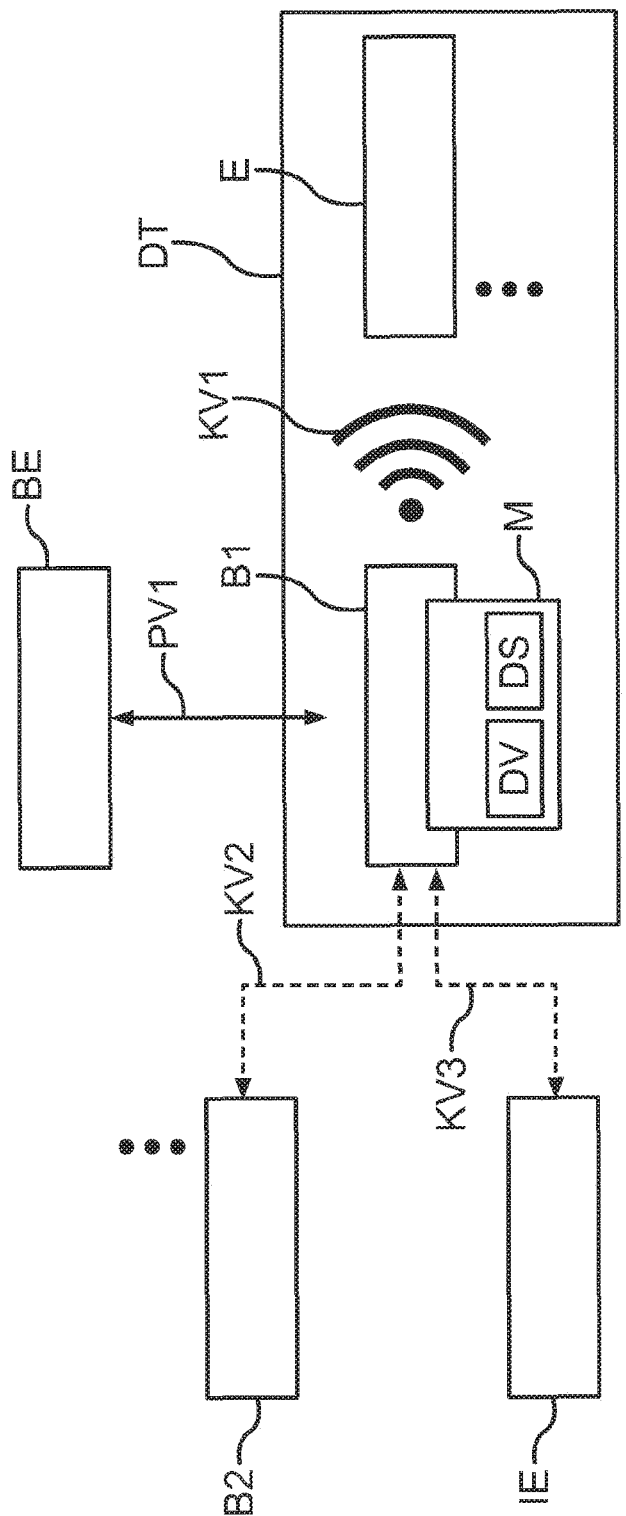
FIG. 1 a schematic representation of the integration of a beacon in a light installation according to the prior art.

The embodiments described in more detail below represent preferred embodiments of the present invention. Therein, it is to be noted that the individual features can be realized not only in the described feature combinations, but also alone or in other technically reasonable feature combinations.

It is the aim to for example protect a beacon storage system from exhaustive discharges. Thereto, a technical system or an assembly can be provided, which includes a transmitting-receiving device or transmitting device (below briefly transmitting device) in/on or as a part of a lamp/light installation or an illuminant (below briefly "on the lighting means") as well as an energy buffer, which provides the required energy to the transmitting device, for example the beacon, in the operation if the energy supply by the lighting means is interrupted. Furthermore, the system comprises an activation mechanism or an activation device (e.g. manual/mechanical/software/via flash unit of a smart device) to change from an energy-saving mode to an operating mode and to protect the energy buffer from an exhaustive discharge.

The transmitting device on the lighting means is preferably supplied with energy via the lighting means. The transmitting device for example cyclically emits a unique identification number. A possibility, in which an expensive energy converter is not required, is the electrical connection of the transmitting device in parallel with the lighting means like LED modules or with a group of LEDs or possibly with an LCD carrier module.

Furthermore, an energy buffer (e.g. accumulator) is part of the overall system or the lighting device. It provides the required energy to the transmitting device, for example the beacon, in the operation if the energy supply by the lighting means is interrupted. The startup or installation of the lighting means represents an example for such a situation, in which the service of the transmitting device for the location-related identification is optionally required without the external energy supply being available via the home supply.

A possible supplement of this characteristic provides that the transmitting device on the lighting means transmits control information to the lighting means via a communication link with it in case of an imminent complete or nearly complete discharge of the energy buffer such that the lighting means is switched on and the energy buffer is thus again charged. Therein, the lighting means does not necessarily have to emit light. Thus, the transmitting device can control the lamp in selected situations (e.g. switching on/off) and thus control the own energy state.

Within the scope of a possible implementation of this solution, a converter is connected between the beacon and the electronic ballast of the illuminant, which translates the data of the transmitting device (e.g. the beacon chip) into a DALI format. Therein, the converter can be part of the transmitting device and/or be configured as a separate system element and/or be part of the lighting means, in particular be integrated in the electronic ballast.

The lighting device has an energy-saving mode, i.e. individual elements or components, in particular the transmitting unit of the transmitting (receiving) device of the lighting device, are regionally switched off and an activation mechanism or an activation device to change from the energy-saving mode to an operating mode. Thus, e.g. within the scope of the production process of the overall system (manufacture and assembly), the system or the transmitting device on the lighting means is set into a state, in which no or only a very low amount of energy is consumed (energy-saving mode). Thus, exhaustive discharge of the energy buffer during the logistic processes between production and installation/startup is prevented. Within the scope of the implementation, various approaches are explained how this activation mechanism can be configured.

In a specific form, the invention provides an activation (or wake-up) of the transmitting device by a light signal, which is emitted by a terminal. In this case, the transmitting device thus represents a transmitting-receiving device with receiving functionality.

During the installation in a service area or in selected situations within the scope of logistics (e.g. commissioning of multiple illuminants in a building), the activation of the transmitting device (e.g. the beacon) is effected such that it can subsequently be configured according to required transmission parameters. Herein, the procedure of the activation means the change of state from a defined energy-saving mode with partially/regionally switched-off system components and an operating mode, wherein it can in turn be differentiated between a regular transmitting-receiving operation and a configuration mode.

Below, various activation mechanisms are explained in detail:

Variant 1:

An optical activation is effected via a photo detector. It acquires a light signal, which is for example initiated by a flash of a smart device. The photo detector transmits an electrical signal for activating the transmitting device.

Variant 2:

The transmitting device wakes up from the energy-saving mode in defined periodic intervals or in cyclical manner (e.g. once per minute). Subsequently, the transmitting device transmits a signal, e.g. advertising data of a beacon, and controls if a connection request from a terminal follows the signal. Subsequently, a change of state can occur at the transmitting device (e.g. "non-connectable", "connectable", e.g. to perform a configuration of the signal strength or the transmission interval).

Variant 3:

An electrical or electronic activation is effected. Therein, immediate activation of the transmitting device is provided if it is supplied with energy via the lighting means (e.g. light installation/lamp) and the corresponding external energy supply (e.g. house connection). In this case, a deviating voltage level is recognized, e.g. by the transmitting device itself. Thus, for instance with an external energy supply by the lighting means, a voltage level of 3 V is applied, while with an energy supply by the energy buffer, a voltage level of 2.8 V is applied. As a result, a change of state of the transmitting device from the energy-saving mode to an operating mode is initiated.

Variant 4:

Compared to variant 3, the activation or the command for a change of state of the transmitting device is effected via an activation pattern or signal pattern. It is for instance initiated by actuating a light switch (on, off, on, off, . . . ). Different voltage levels between the external and internal energy supply (internal: supply via energy buffer) again constitute the basis.

Variant 5:

Besides the energy buffer, an additional battery is installed in the manufacture. The battery supplies the energy buffer with energy during storage and transport. As soon as the lamp or the illuminant is supplied with current, it is switched from the battery to normal accumulator operation.

Variant 6:

The energy supply or a special contact of the transmitting device is separated by an insulating element or a "zipper" (e.g. paper, non-conducting foil) during the transport. Upon the installation of the lamp, the insulating element is withdrawn and the beacon is thus activated or awoken from the energy-saving mode.

Figure 2:
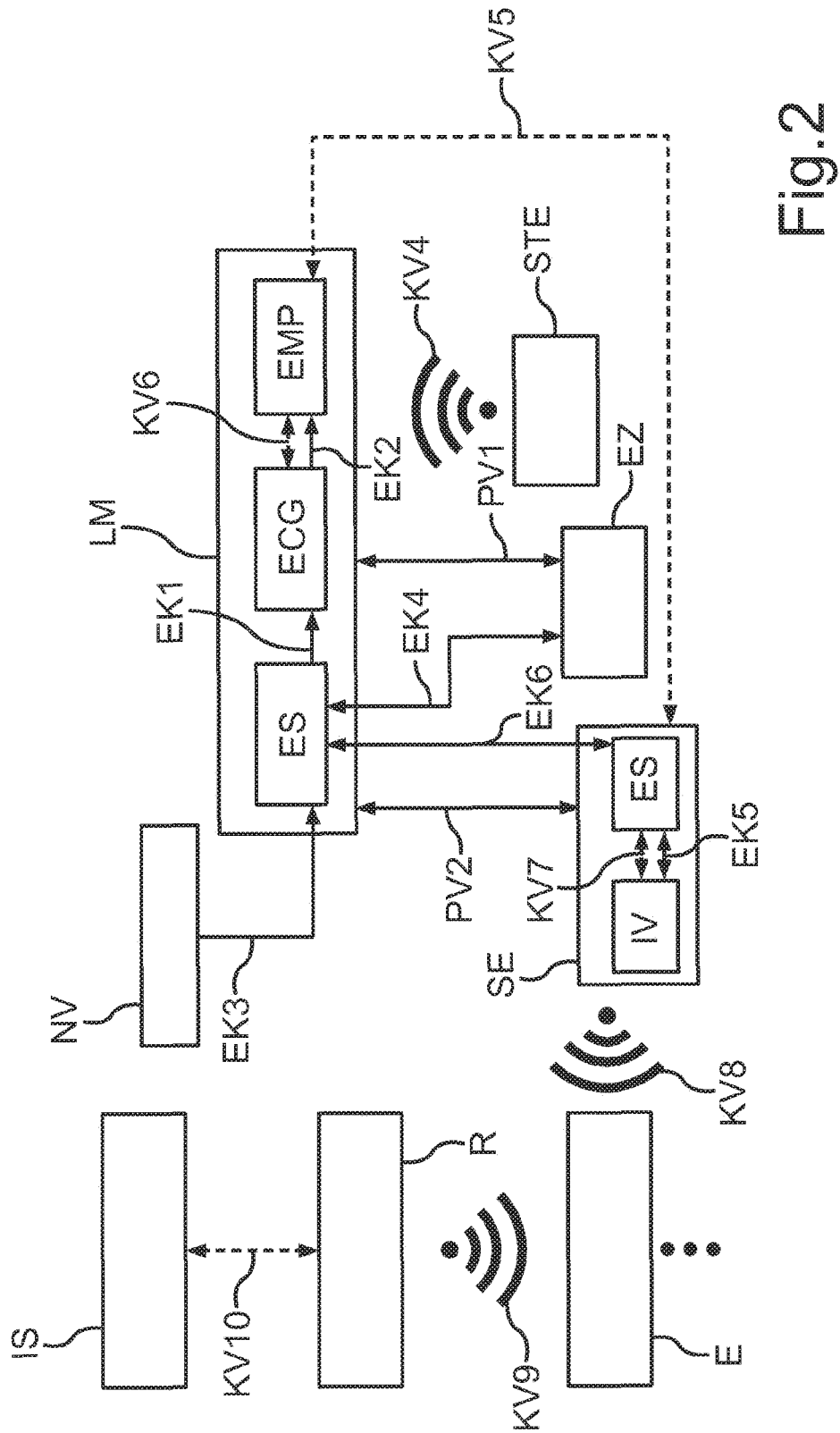
FIG. 2 a concept of a lighting device with activation of the transmitting device via an optical signal.

In context of FIG. 2, an embodiment according to variant 1 is now explained in more detail. In this concept, the activation of the transmitting device SE is effected via an optical signal of a communication link KV4, which is received by a receiver EMP, e.g. a photo detector, of the lighting means LM. This receiver EMP acquires a light signal, which is for example initiated by a flash of a smart device as a controlling terminal STE. The photo detector or receiver EMP transmits an electrical signal for activating the transmitting device SE via a communication link KV5.

The remaining components of the lighting device or the overall system are arranged and connected, respectively, as follows. The lighting means comprises an electronic ballast ECG and an energy interface ES besides the receiver EMP. A communication link KV6 exists between the electronic ballast ECG and the receiver EMP. An energy transfer channel EK1 exists from the energy interface ES to the ballast ECG and an energy transfer channel EK2 exists from the electronic ballast ECG to the receiver EMP. The energy interface ES obtains its energy in turn via an energy transfer channel EK3 from a mains supply NV external with respect to the lighting device, which for example provides an AC voltage of 230 V.

An energy buffer EZ is arranged in or on the lighting means LM according to a physical connection PV1 or formed as a part thereof. A bidirectional energy transfer channel EK4 exists between the energy interface ES and the energy buffer EZ.

The transmitting device SE, which can also have receiving functionality, internally comprises an information processing unit IV and also an energy interface ES. These two components are in contact with each other via a communication link KV7. Similarly, an energy transfer channel EK5 exists between them. According to the physical connection PV2, the transmitting device SE is arranged in/on or as a part of the lighting means LM. In addition, an energy transfer channel EK6 exists between the energy interface ES of the lighting means LM and the energy interface ES of the transmitting device SE.

A wireless communication link KV8 can exist from the transmitting device SE to one or more terminals E. This communication link is preferably a BLE link. The terminal or terminals E can be in communication with a router R via a wireless communication link KV9 (e.g. WiFi). Furthermore, a communication link KV10 can exist to an infrastructure for services IS. This infrastructure can e.g. be the Internet or a central service server.

Figure 3:
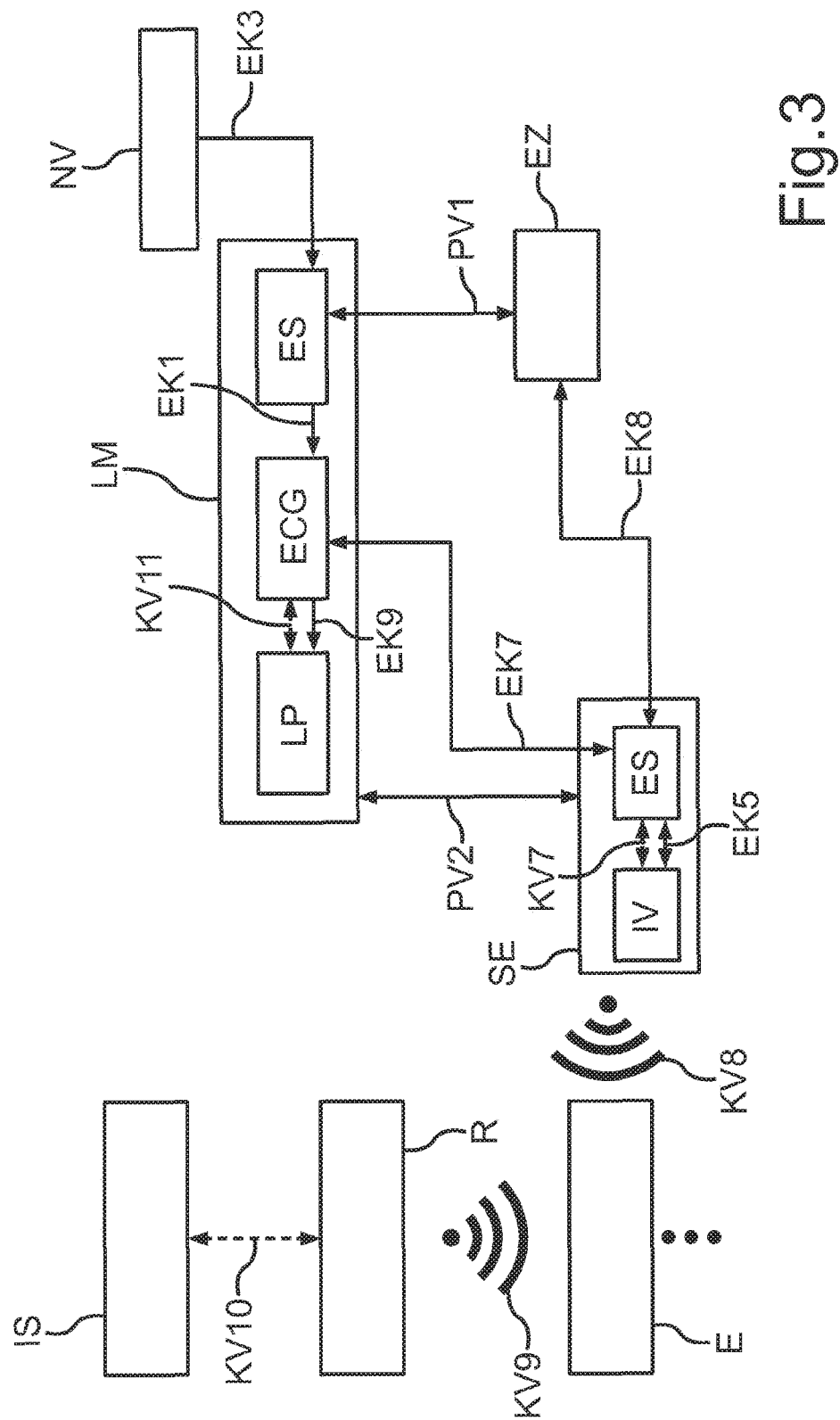
FIG. 3 a concept of a lighting device with immediate activation of the transmitting device when it is supplied with energy.

FIG. 3 schematically illustrates a further embodiment of the present invention. In this concept, immediate activation of the transmitting device SE is effected if it is supplied with energy via the lighting means LM and the corresponding external mains supply NV (e.g. house connection). A deviating voltage level is recognized, e.g. by the transmitting device SE itself, via an energy transfer channel EK7 between the electronic ballast ECG and the energy interface ES of the transmitting device SE. Thus, with an external energy supply by the illuminant LM, a voltage level of 3 V is applied, while a voltage level of 2.8 V is applied with an energy supply by the energy buffer EZ. The latter results with an energy transfer channel EK8 between the energy interface ES of the transmitting device SE and the energy buffer EZ.

In the present example, the lighting means LM is for example equipped with a LED board LP. It is in communication link KV11 with the electronic ballast ECG and obtains its energy from it via an energy transfer channel EK9.

With respect to the remaining components and connections of the lighting device or the system of FIG. 3, reference is made to the description of the components and connections, respectively, of the example of FIG. 2.

Figure 4:
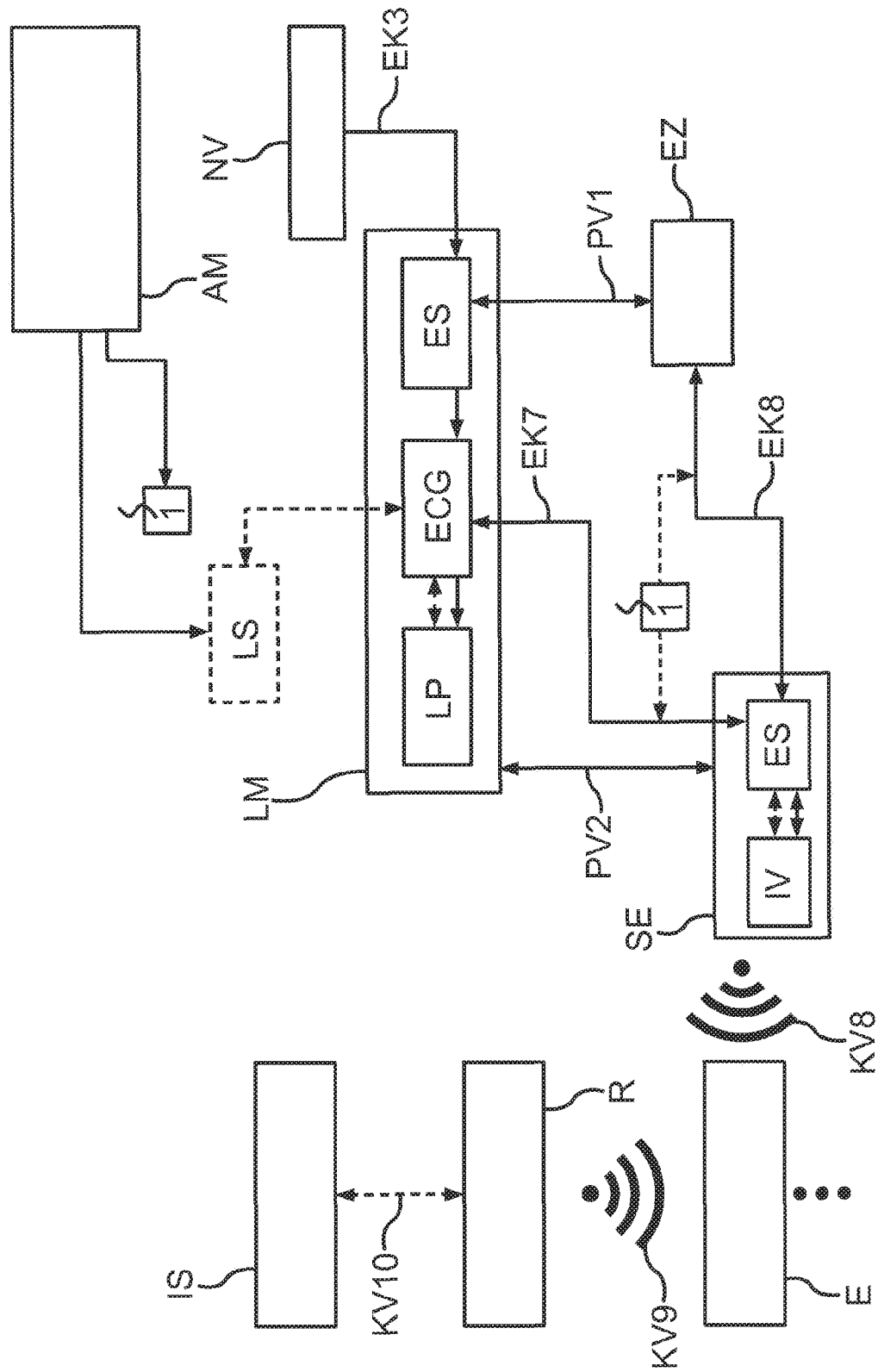
FIG. 4 a concept of the lighting device, the transmitting device of which can be activated by an activation pattern.

In a further embodiment according to FIG. 4, the activation or the initiation of a change of state of the transmitting device SE is effected via an activation pattern AM or signal pattern. It is for instance initiated by actuating a light switch LS (on, off, on, off, . . . ). Different voltage levels between the external and the internal energy supply (internal: supply via energy buffer EZ) again constitute the basis. The activation pattern AM can also be directly fed to the energy transfer channel EK7 between the energy storage ES of the transmitting device SE and the electronic ballast ECG of the lighting means LM or to the energy transfer channel EK8 between the energy interface ES of the transmitting device SE and the energy buffer EZ.

With respect to the remaining components and connections, reference is again made to the description of these components in context of the example of FIG. 2.

Advantageously, the systems according to the invention ensure that an error-prone exchange of batteries in lighting means with transmitting devices can be largely avoided. In particular, exhaustive discharge can also be inhibited during the logistic processes.

The invention claimed is:

1. A lighting device comprising:
    an illuminant,
    a transmitting device for transmitting an electromagnetic data signal, and
    an energy buffer for current supply of the transmitting device, and
    an activation device, by which the transmitting device can be activated from an energy-saving mode, in which the transmitting device is switched off, into an operating mode, in which the transmitting device is switched on for operationally transmitting the electromagnetic data signal;
    wherein:
    the activation device is configured to determine when periodic switching cycles of the transmitting device occur; and
    the activation device is configured to activate the transmitting device or keep the transmitting device activated despite an activated exhaustive discharge protection in case of internal current supply.

2. The lighting device according to claim 1, further comprising a main supply terminal, via which both the illuminant and the transmitting device and/or the energy buffer can be supplied with energy.

3. The lighting device according to claim 1, wherein the illuminant, the transmitting device, the energy buffer and the activation device are accommodated in a common housing.

4. The lighting device according to claim 1, wherein the transmitting device can be switched to a transmitting-receiving operation and/or a configuration operation by the activation device in the operating mode.

5. The lighting device according to claim 1, wherein the activation device comprises a photo detector, by which a light pulse is detectable for activating the transmitting device or for switching the transmitting device.

6. The lighting device according to claim 1, wherein the transmitting device can be cyclically activated by the activation device.

7. The lighting device according to claim 1, wherein the transmitting device is configured such that it transmits a signal and examines if a connection request is present after each activation.

8. The lighting device according to claim 1, wherein the activation device is configured such that the transmitting device is automatically activated as soon as the lighting device is supplied with energy from an external energy supply device.

9. The lighting device according to claim 8, wherein an input voltage of the lighting device can be acquired by a digital-analog converter and a corresponding value can be digitally transferred to the activation device or can be communicated from the energy supply device to the activation device via a communication interface of the lighting device.

10. The lighting device according to claim 1, wherein the activation device comprises a computing unit, by which the type of the energy supply of the transmitting device or a state of charge of the energy buffer is recognizable.

11. The lighting device according to claim 1, which is configured such that the transmitting device does not change to the energy-saving mode after an external current supply has been effected for a preset period of time.

12. The lighting device according to claim 10, wherein a functionality of the lighting device can be automatically restricted if the state of charge of the energy buffer falls below a preset limit value.

13. The lighting device according to claim 1, wherein the activation device is configured to examine a current supply of the lighting device in preset intervals and to correspondingly control the transmitting device.

14. The lighting device according to claim 1, wherein the activation device is configured such that the transmitting device is activated as soon as a preset activation pattern is transferred to the lighting device via an external energy supply device.

15. The lighting device according to claim 1, further comprising a battery for supply of the transmitting device besides the energy buffer, wherein the battery can be automatically electrically disconnected from the transmitting device if the lighting device obtains energy from an external energy supply device.

16. The lighting device according to claim 1, wherein the activation device contains an insulating element, by the removal of which the transmitting device is switched from the energy-saving mode to the operating mode.

17. The lighting device according to claim 1, wherein the transmitting device is further supplied with energy via the illuminant.

18. A method for operating a lighting device comprising:
an illuminant,
a transmitting device for transmitting an electromagnetic data signal,
an energy buffer for current supply of the transmitting device,
an activation device, by which the transmitting device can be activated from an energy-saving mode, in which the transmitting device is switched off, into an operating mode, in which the transmitting device is switched on for operationally transmitting the electromagnetic data signal; wherein the activation device comprises a computing unit configured to determine a state of charge of the energy buffer;
wherein the method comprises:
determining, by the activation device, when periodic switching cycles of the transmitting device occur; and
activating the transmitting device or keeping the transmitting device activated, by the activation device, despite an activated exhaustive discharge protection in case of internal current supply based on when the periodic switching cycles of the transmitting device occur.

* * * * *